(12) United States Patent
Navada et al.

(10) Patent No.: US 7,804,890 B2
(45) Date of Patent: Sep. 28, 2010

(54) METHOD AND SYSTEM FOR RESPONSE DETERMINISM BY SYNCHRONIZATION

(75) Inventors: Muraleedhara H. Navada, Santa Clara, CA (US); Tim Frodsham, Portland, OR (US); Sanjay Dabral, Palo Alto, CA (US); Allen Baum, Palo Alto, CA (US); Chris D. Matthews, Folsom, CA (US); Chris C. Gianos, Sterling, MA (US); Rahul R. Shah, Marlborough, MA (US); Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 11/166,030

(22) Filed: Jun. 23, 2005

(65) Prior Publication Data

US 2007/0041405 A1    Feb. 22, 2007

(51) Int. Cl.
*H04B 3/46* (2006.01)
(52) U.S. Cl. ........................ 375/226; 375/364; 375/354; 375/368; 375/376; 375/362; 713/324; 713/401; 713/400; 710/107; 710/100; 710/307; 710/104
(58) Field of Classification Search ................. 375/354, 375/222; 713/324, 401, 400, 501; 710/107, 710/100, 307, 104; 702/118; 714/30; 706/16
See application file for complete search history.

(56) References Cited

U.S. PATENT DOCUMENTS

| | | | | |
|---|---|---|---|---|
| 5,758,134 | A * | 5/1998 | Imel et al. | 713/501 |
| 6,009,488 | A | 12/1999 | Kavipurapu | |
| 6,289,406 | B1 * | 9/2001 | Chambers et al. | 710/107 |
| 6,456,676 | B1 * | 9/2002 | O'Connor et al. | 375/354 |
| 7,017,067 | B2 * | 3/2006 | Zielbauer | 713/401 |
| 7,107,371 | B1 * | 9/2006 | Bell | 710/104 |
| 7,136,953 | B1 * | 11/2006 | Bisson et al. | 710/307 |
| 7,209,907 | B2 * | 4/2007 | Cherukuri et al. | 706/16 |
| 7,313,712 | B2 * | 12/2007 | Cherukuri et al. | 713/324 |
| 7,328,359 | B2 * | 2/2008 | Frodsham et al. | 713/400 |
| 7,370,132 | B1 * | 5/2008 | Huang et al. | 710/307 |
| 2003/0035471 | A1 * | 2/2003 | Pitsoulakis | 375/222 |
| 2003/0070118 | A1 * | 4/2003 | Nakao et al. | 714/30 |
| 2005/0022100 | A1 * | 1/2005 | Lee et al. | 714/781 |
| 2005/0182588 | A1 * | 8/2005 | Chenoweth et al. | 702/118 |
| 2006/0041696 | A1 * | 2/2006 | Cherukuri et al. | 710/100 |

OTHER PUBLICATIONS

U.S. Appl. No. 10/887,225, filed Jul. 21, 2004, Frodsham et al.
U.S. Appl. No. 11/011,301, filed Dec. 13, 2004, Frodsham et al.

* cited by examiner

*Primary Examiner*—Sudhanshu C Pathak
(74) *Attorney, Agent, or Firm*—Caven & Aghevli LLC (57) ABSTRACT

A discussion of improving integrated device deterministic response to test vectors. For example, limiting the transmission delay for an integrated device's response within known bounds by synchronizing an initialization training sequence to a reset deassertion. Specifically, the proposal facilitates response determinism from the DUT by synchronizing training sequences and subsequently synchronizing flit transmission to reset assertion as sampled by reference clock.

16 Claims, 6 Drawing Sheets

| Byte | Field | Description |
|---|---|---|
| 0 | Header | A unique signature for a given training sequence, used by a receiving port to detect a training sequence. |
| 1 | ACK field | Handshake field used for advancing training states |
| 2-7 | Pay Load | A training state specific field and could have multiple sub fields of varying lengths and the values could be static or dynamic. |

Figure 6 Attorney docket 042390.P21882

METHOD AND SYSTEM FOR RESPONSE DETERMINISM BY SYNCHRONIZATION

BACKGROUND OF THE INVENTION

1. Field of the Invention

The present invention relates to design for test and debug, specifically, response determinism using synchronization techniques.

2. Description of the Related Art

As the technology for manufacturing integrated circuits advances, more logic functions are included in a single integrated circuit device or a system on a chip (SoC). Modem integrated circuit (IC) devices include large numbers of gates on a single semiconductor chip, with these gates interconnected so as to perform multiple and complex functions. The fabrication of an IC incorporating such Very Large Scale Integration (VLSI) must be error free, as a single manufacturing defect may prevent the IC from performing all of the functions that an IC or SoC is designed to perform. Such demands require verification of the design of the IC or SoC and also various types of electrical testing after the IC or SoC is manufactured.

Typically, automatic test equipment (ATE) facilitates testing of the chip, or device under test (DUT), via a plurality of test and control signals. Point to point (pTp) systems that utilize interconnects such as, PCI-Express or CSI, require determinism in order to accurately determine the timing of a response with respect to a clock signal, such as a master or reference clock.

The ATE injects test vectors in to the DUT and obtains responses in a specific pre-calculated time slots ensuring validation and high efficiency. In components that utilize point to point links, tester injects and checks vectors through the links. For example, the vector may flow through several stages such as physical layer and uncore Logic before reaching the processor core. Determinism in the device is required to achieve practical tester efficiency. A repeatable, deterministic alignment of events in all the blocks of the component produces a predictable test response.

Current implementations, such as PCI-Express, are not predictable to a clock cycle due to the transmission delay from the interconnect links with respect to a clock signal and achieve DUT response determinism by searching for a known pattern in a response from the DUT. The searching operations, also known as hunting, are time critical and can take several milliseconds. These searching operations are inefficient, increase the testing time and therefore the overall hardware cost.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The current application may utilize embodiments depicted in related application Ser. Nos. 10/897,225 and 11/011,301, filed on Jul. 21, 2004 and Dec. 13, 2004.

Ser. No. 11/011,301 is entitled "METHOD, SYSTEM, AND APPARATUS FOR LINK LATENCY MANAGEMENT" with inventors: Tim Frodsham, Michael J. Tripp, David J. O'Brien, Navada Herur Muraleedhara, Naveen Cherukuri, Sanjay Dabral, David Dunning, and Theodore Z. Schoenborn.

Ser. No. 10/897,225 is entitled "A TECHNIQUE TO CREATE LINK DETERMINISM with inventors: Tim Frodsham, Michael J. Tripp, David J. O'Brien, Navada Herur Muraleedhara, Naveen Cherukuri, Sanjay Dabral, David Dunning, and Theodore Z. Schoenborn.

Figure 6:
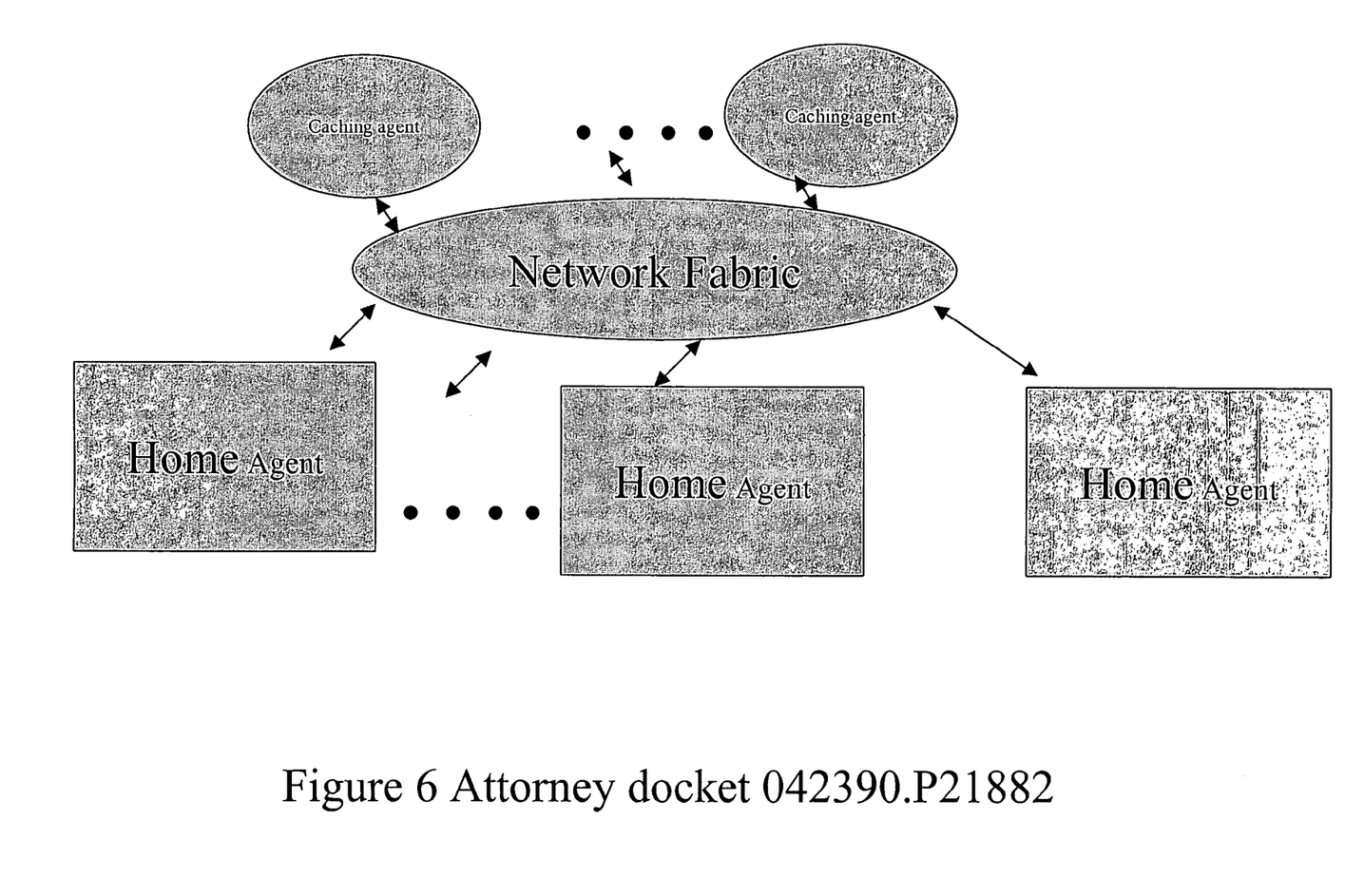
FIG. 6 is a diagram of a cache coherence protocol agent's abstract view of an underlying network as utilized by one embodiment.

In one embodiment, the claimed subject matter may be utilized for an architecture that depicts a plurality of caching agents and home agents coupled to a network. For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, this can be seen as a cache coherence protocol agent's abstract view of the underlying network (see FIG. 6).

An area of current technological development relates to DFT. As previously described, the existing solutions require searching operations, also known as hunting, that are time critical and expected to take several milliseconds. Therefore, the searching operations increase the testing time as well as hardware cost.

In contrast, a method and a system are proposed that facilitates response determinism by limiting the transmission delay for a DUT's response within known bounds by synchronizing an initialization training sequence to a known event. Specifically, the claimed subject matter facilitates response determinism from the DUT by synchronizing training sequences and subsequently synchronizing data transmission to reset deassertion as sampled by a reference clock. In one embodiment, a data packet contains the necessary information for the training sequence, wherein the data packet is a plurality of flits, where a flit represents the shortest sequence of data transmission on a link.

The related applications discuss a determinism mechanism to allow a device under test (DUT) to compute the latency of the incoming data and add enough latency to the incoming data to fix the latency to a predetermined amount. Therefore, the response of the DUT to the test vectors is deterministic.

Figure 1:
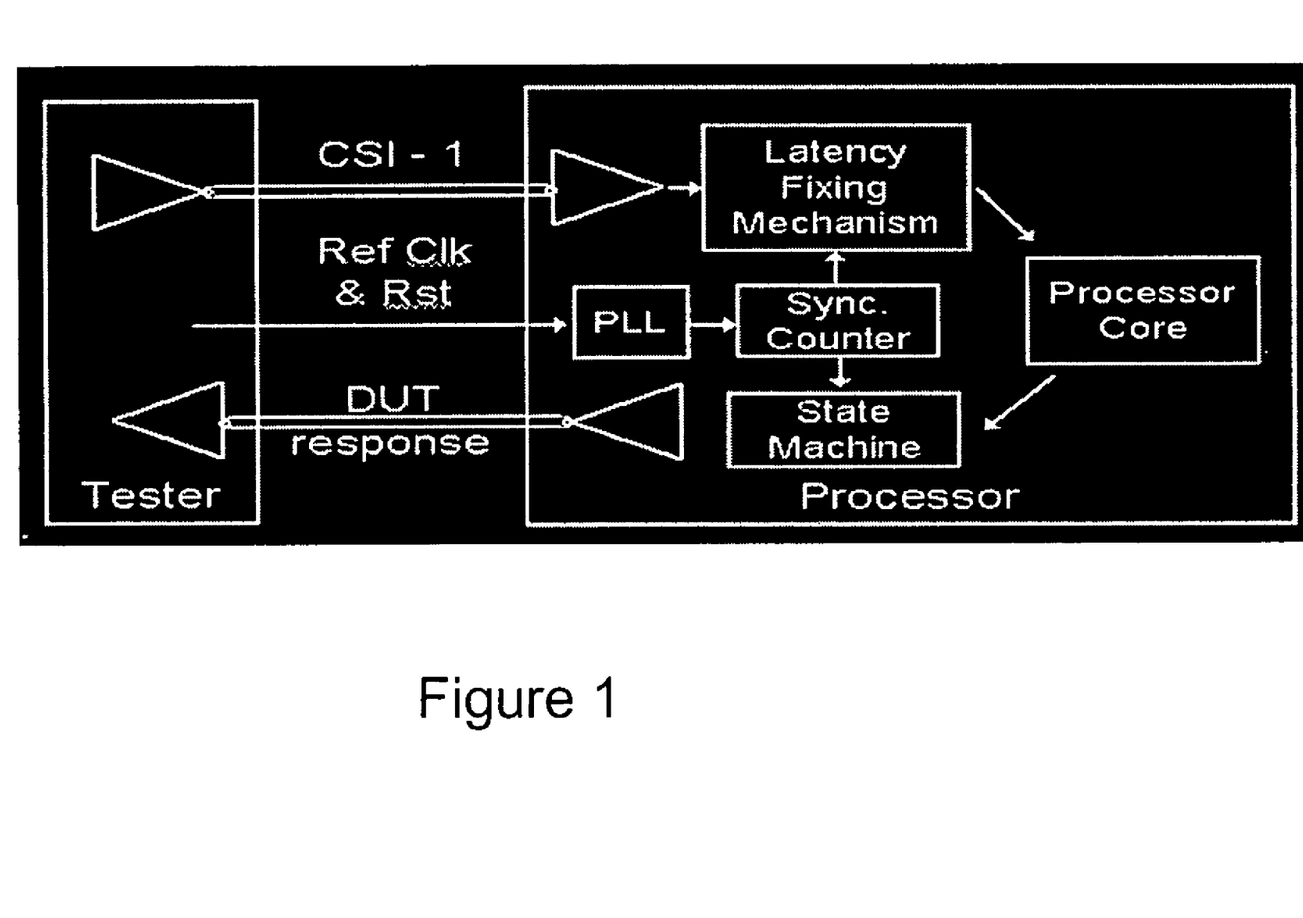
FIG. 1 is a block diagram as utilized by one embodiment of the claimed subject matter.

FIG. 1 is a block diagram as utilized by one embodiment of the claimed subject matter. In one embodiment, the Tester generates stored vectors along with a master reset and a clock signal. As discussed earlier, deterministic response from the component, the DUT, with respect to reference clock cycles starting from the deassertion of a reset signal is expected. The response is compared against expected vector. In this pending application, the claimed subject matter facilitates DUT deterministic response by ensuring determinism with respect to a DUT to the Tester. In contrast, the previously discussed related applications, Ser. Nos. 10/897,225 and 11/011,301, facilitated DUT deterministic response with respect to the Tester to a DUT.

Figure 2A:
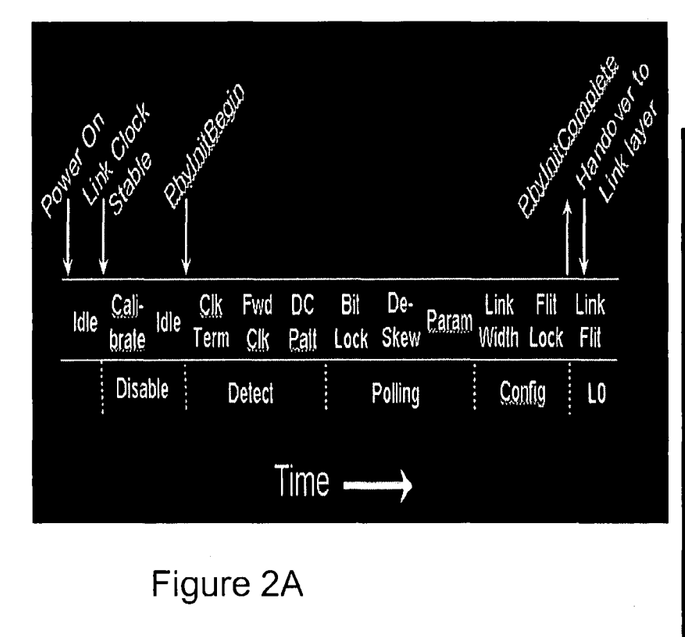
FIG. 2A is a state timing diagram for a sequence of initialization as utilized by one embodiment of the claimed subject matter.

FIG. 2A is a state timing diagram for a sequence of initialization as utilized by one embodiment of the claimed subject matter. This diagram depicts a sequence for a link initialization in time. Each of the different states are depicted, from initial Disable state to the Detect state. Subsequently, the Polling state precedes the Config state and completes with a L0 state. Within each state, there a plurality of blocks that represent training sequence boundaries such as, Idle, Calibrate, Clk Terminate, Bit Lock, etc. In this embodiment, the tester injects vectors that are sent to the component (DUT) deterministically using latency mechanism depicted in the related application Ser. No. 11/011,301.

Figure 2B:
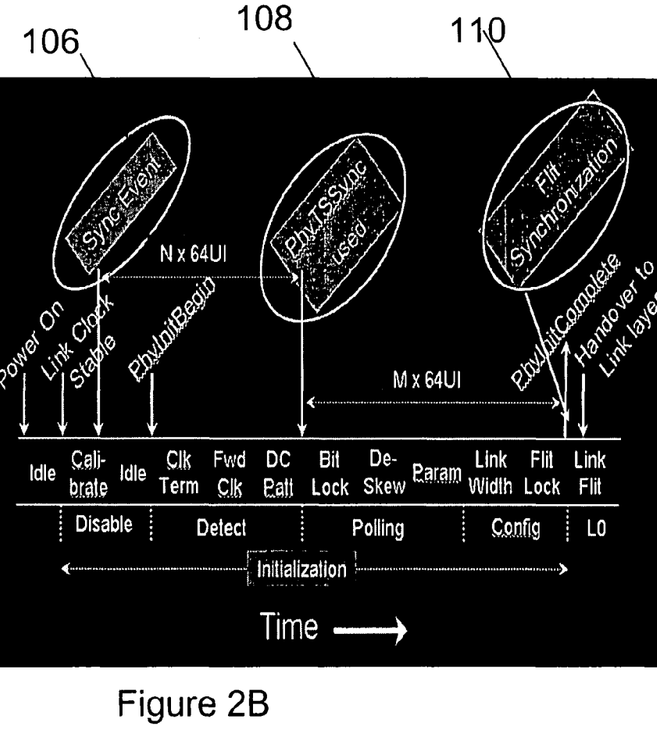
FIG. 2B is a modified state timing diagram of initialization for synchronization as utilized by one embodiment of the claimed subject matter.
Figure 3:
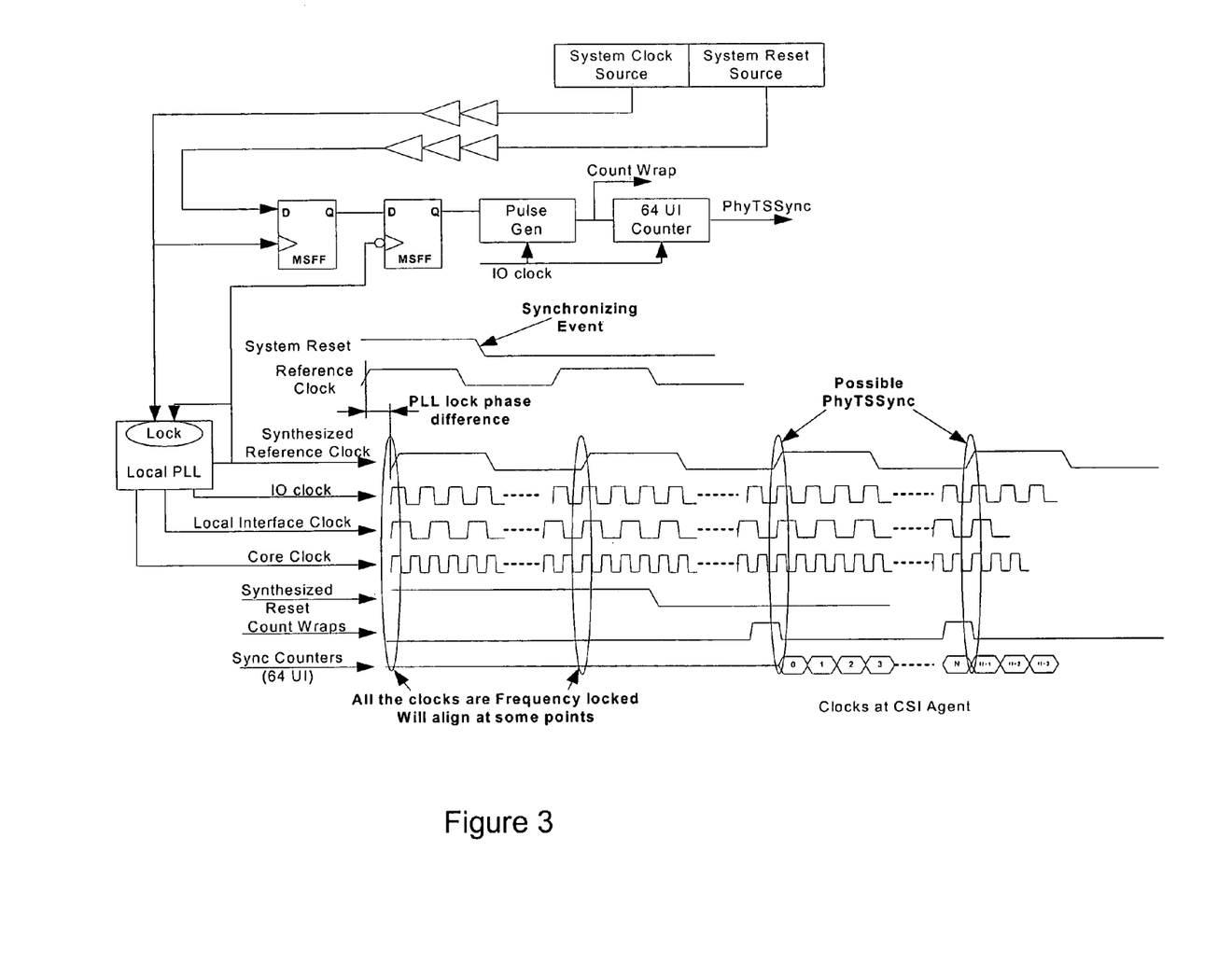
FIG. 3 is a schematic diagram for generating a control signal from a reset assertion as utilized by one embodiment of the claimed subject matter.

FIG. 2B is a modified state timing diagram of initialization for synchronization as utilized by one embodiment of the claimed subject matter. In this timing diagram, modifications to the initialization sequence depicted in connection with FIG. 2A have been included to achieve data packet (flit) synchronization. For example, at synchronization event 106, a counter that is started that generates the PhyTSSync signal at location 108, and results in data packet synchronization at location 110. In one embodiment, the synchronization event 106 occurs aligned to the deassertion of reset as sampled by a reference clock at a pin of the component (DUT). In this embodiment, the reset clock is a system reset clock (that is depicted in FIG. 3).

Consequently, a counter is to start at the synchronizing event and run using a port link clock. In one embodiment, the port link clock is derived from a master reference clock. For example, in this embodiment, the port link clock is an integral multiple of the master reference clock and is 2.4 GHz while the master reference clock is 200 MHz. The counter generates a signal PhyTSSync that has a periodic pulse that corresponds to the training sequence length (wherein the generation is discussed in further detail in connection with FIG. 3). As indicated by the figure at label 108, the PhyTSSync is used to synchronize the depicted state timing diagram during the transition from the detect state to the polling state. Therefore, the first training sequence sent during the polling state is synchronized to the master reset signal. Subsequently, all the training sequences are sent back to back and the link begins operation with a precise and known alignment to the synchronizing event.

Synchronizing the training sequence boundaries will automatically synchronize the flit boundaries to one of the possible 64UI boundary. Tester can keep track of possible arrivals of the flit. In one embodiment, the reason it synchronizes is that the flit is always a divisor of the training sequence length (TSL).

The tester can control the transmission of first flit using the acknowledgement in the injected vector. As the latency from tester to DUT is fixed according the related application Ser. No. 11/011,301, acknowledgement is made to reach DUT deterministically. Therefore, in this embodiment, the combination of latency fixing and the data packet (flit) synchronization explained here achieves over all tester determinism.

FIG. 3 is a schematic diagram for generating a control signal from a reset deassertion as utilized by one embodiment of the claimed subject matter. As discussed earlier, the control signal is depicted as PhyTSSync. Also, a counter was made to start at the synchronizing event and runs using the port link clock. Furthermore, the counter generates the PhyTSSync signal that has a periodic pulse that corresponds to the training sequence length. In one embodiment, the PhyTSSync period is chosen to be a multiple of the possible flits and training sequence and system_clk_source lengths. In this embodiment, it is defined as: TSL*system_clk_source.

Figure 4:
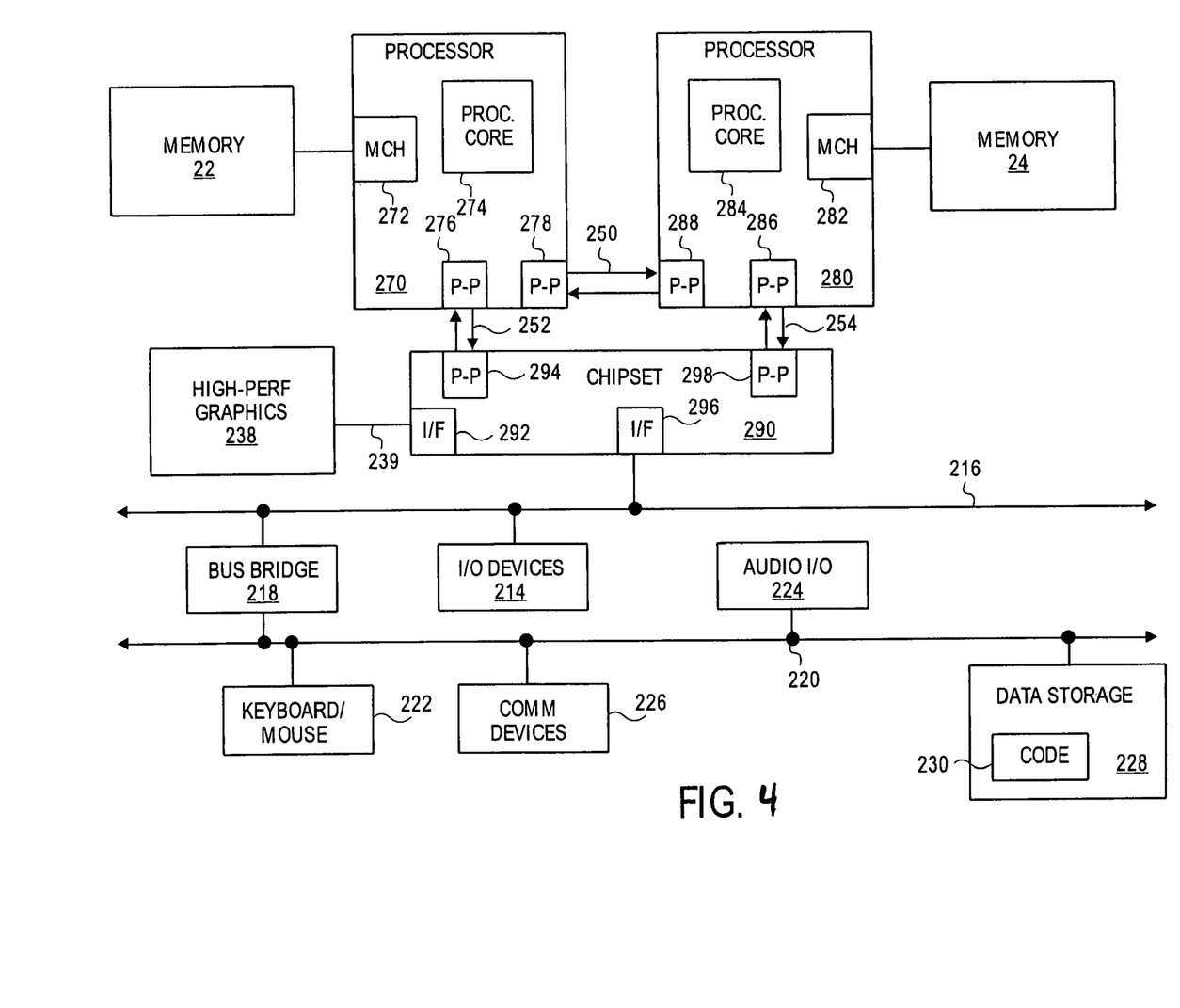
FIG. 4 shows a system as utilized by one embodiment of the claimed subject matter.

FIG. 4 illustrates a computer system that is arranged in a point-to-point (PtP) configuration, with varying numbers of devices communicating via point to point links. In one embodiment, the point to point configuration supports the layered protocol scheme depicted in conection with FIGS. 1 and 2. In particular, FIG. 4 shows a system where processors, memory, and input/output devices are interconnected by a number of point-to-point interfaces. The system of FIG. 4 may also include several processors, of which only two, processors 270, 280 are shown for clarity. Processors 270, 280 may each include a local memory controller hub (MCH) 272, 282 to connect with memory 22, 24. Processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. Chipset 290 may also exchange data with a high-performance graphics circuit 238 via a high-performance graphics interface 239.

At least one embodiment of the invention may be located within the PtP interface circuts within each of the PtP bus agents of FIG. 2. Other embodiments of the invention, however, may exist in other circuits, logic units, or devices within the system of FIG. 2. Furthermore, other embodiments of the invention may be distributed throughout several circuits, logic units, or devices illustrated in FIG. 2.

Figure 5:
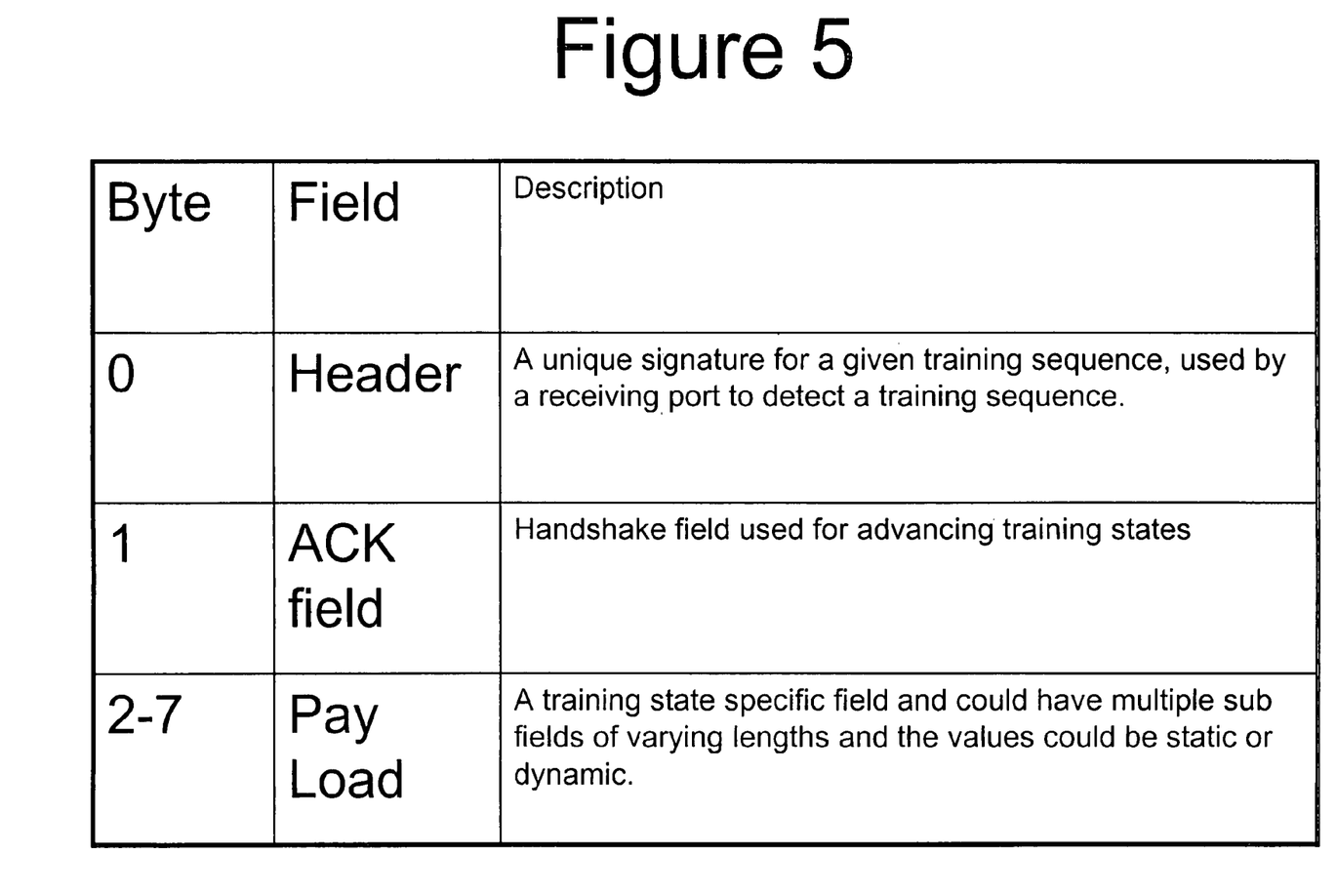
FIG. 5 illustrates one embodiment of a training sequence format.

FIG. 5 illustrates one embodiment of a training sequence format. The format depicts a generic format that may be used and altered to the desired specifications of the computer system. For example, the header may have an unique signature and the pay load could have multiple sub-fields.

Also, the claimed subject matter depicted in the previous Figures and Tables may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone).For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A circuit to facilitate deterministic operation of an integrated device comprising:

a counter circuit to generate a first control signal to have a periodic pulse based on a training sequence length of a data packet, the first control signal to be used to synchronize a state machine during a transition from a detect state to a polling state;

a circuit to generate a second control signal to add latency to incoming data such that an overall latency is of a predetermined amount;
generating a deterministic response for the integrated device to any applied test vectors based on the first and second control signals;
wherein the first control signal and the second control signal are generated based on a signal from a phase-locked loop (PLL) and a reset deassertion as sampled by a reference clock; and
further wherein the first control signal based on a reset condition, wherein the synchronizing event is based on a predetermined time after the reset condition that is based on a training sequence length.

2. The circuit of claim 1 wherein the data packet is a plurality of flits, such that a flit is the shortest sequence of data transmission on a link in a point to point system.

3. The circuit of claim 2 wherein the point to point system supports a layered protocol.

4. An apparatus to facilitate deterministic operation of an integrated device comprising:
a counter apparatus to first synchronize a data packet with a training sequence based at least in part on a first control signal, the first control signal to have a periodic pulse based on a training sequence length of the data packet, the apparatus to subsequently synchronize a flit transmission to reset assertion as sampled by a reference clock;
an apparatus is to generate a second control signal to add latency to incoming data such that an overall latency is of a predetermined amount;
generating a deterministic response for the integrated device to any applied test vectors based on the first and second control signals;
wherein the first control signal and the second control signal are to be generated based on a signal from a phase-locked loop (PLL) and a reset deassertion as sampled by the reference clock; and
further wherein the first control signal based on a reset condition, wherein the synchronizing event is based on a predetermined time after the reset condition that is based on a training sequence length.

5. The apparatus of claim 4 wherein the data packet is a plurality of flits, such that a flit is the shortest sequence of data transmission on a link in a point to point system.

6. The apparatus of claim 4 wherein the point to point system supports a layered protocol.

7. A method for facilitating deterministic operation of an integrated device comprising:
computing a latency of incoming data to the integrated device;
adding latency to the incoming data such that the overall latency is of a predetermined amount;
generating in a deterministic response for the integrated device to any applied test vectors, wherein adding latency to the incoming data is based on a first signal, generated by a counter, from a phase-locked loop (PLL) and a reset deassertion as sampled by a reference clock;
synchronizing a data packet with a training sequence based at least in part on a second signal, the second signal to have a periodic pulse based on a training sequence length of the data packet, and subsequently synchronizing a flit transmission to reset assertion as sampled by the reference clock;
wherein the second signal is to be generated based on a signal from the phase-locked loop (PLL) and a reset deassertion as sampled by the reference clock; and further wherein the first signal is based on a reset condition, wherein the synchronizing event is based on a predetermined time after the reset condition that is based on a training sequence length.

8. The method of claim 7 wherein the data packet is a plurality of flits, such that a flit is the shortest sequence of data transmission on a link in a point to point system.

9. The method of claim 8 wherein the point to point system supports a layered protocol.

10. An integrated device, to be coupled to a testing system and to receive a plurality of test vectors, the integrated device with circuitry to facilitate deterministic response to from the integrated device when it receives test vectors from the testing system comprising:
a counter to start based on a synchronizing event;
the counter to generates a first control signal that has a periodic pulse that corresponds to a training sequence length of a data packet;
the counter to generate a second control signal to add latency to incoming data such that an overall latency is of a predetermined amount;
generating a deterministic response for the integrated device to any applied test vectors based on the first and second control signals;
wherein the first control signal and the second control signal are to be generated based on a signal from a phase-locked loop (PLL) and a reset deassertion as sampled by a reference clock; and the first control signal is used to synchronize a state machine during a transition from a first state to a second state; and
further wherein the first signal is based on a reset condition, wherein the synchronizing event is based on a predetermined time after the reset condition that is based on a training sequence length.

11. The integrated device of claim 10 wherein the first state is a detect state to and a second state is a polling state.

12. The integrated device of claim 11 wherein the data packet is a plurality of flits, such that a flit is the shortest sequence of data transmission on a link in a point to point system.

13. The integrated device of claim 12 wherein the point to point system supports a layered protocol.

14. An integrated device, to be coupled to a testing system and to receive a plurality of test vectors, the integrated device with circuitry to facilitate deterministic response to from the integrated device when it receives test vectors from the testing system comprising:
a counter generating a first control signal for synchronizing the integrated device to a training sequence data packet based on a first control signal, subsequently synchronizing a data packet boundary since the data packet boundary is a divisor of a length of training sequence data packet;
circuitry to generate a second control signal to add latency to incoming data such that an overall latency is of a predetermined amount;
generating in a deterministic response for the integrated device to any applied test vectors based on the first and second control signals;
wherein the first control signal and the second control signal are to be generated based on a signal from a phase-locked loop (PLL) and a reset deassertion as sampled by a reference clock; and
further wherein the first signal is based on a reset condition, wherein the synchronizing event is based on a predetermined time after the reset condition that is based on a training sequence length.

15. The integrated device of claim 14 wherein the data packet is a plurality of flits, such that a flit is the shortest sequence of data transmission on a link in a point to point system.

16. The integrated device of claim 15 wherein the point to point system supports a layered protocol.

* * * * *